United States Patent [19]
McCombs

[11] Patent Number: 5,474,595
[45] Date of Patent: Dec. 12, 1995

[54] CAPACITY CONTROL SYSTEM FOR PRESSURE SWING ADSORPTION APPARATUS AND ASSOCIATED METHOD

[75] Inventor: Norman R. McCombs, Tonawanda, N.Y.

[73] Assignee: AirSep Corporation, Buffalo, N.Y.

[21] Appl. No.: 232,681

[22] Filed: Apr. 25, 1994

[51] Int. Cl.⁶ ............................................... B01D 53/047
[52] U.S. Cl. ........................ 95/23; 95/96; 95/130; 96/109; 96/116; 96/130; 96/133; 96/144
[58] Field of Search ........................ 95/12, 22, 23, 95/96–98, 100, 103, 105, 130; 96/109, 114–116, 130, 133, 144

[56] References Cited

U.S. PATENT DOCUMENTS

| | | | |
|---|---|---|---|
| 3,922,149 | 11/1975 | Ruder et al. | 95/22 |
| 4,264,340 | 4/1981 | Sircar et al. | 95/130 X |
| 4,349,357 | 9/1982 | Russell | 95/130 X |
| 4,378,982 | 4/1983 | McCombs | 96/130 X |
| 4,472,177 | 9/1984 | Sircar | 95/98 X |
| 4,477,264 | 10/1984 | Kratz et al. | 95/103 |
| 4,521,221 | 6/1985 | Richter et al. | 95/98 X |
| 4,534,346 | 8/1985 | Schlaechter | 96/144 X |
| 4,584,001 | 4/1986 | Dechene | 96/114 |
| 4,643,743 | 2/1987 | Grader | 95/100 |
| 4,648,888 | 3/1987 | Rowland | 96/114 X |
| 4,725,293 | 2/1988 | Gunderson | 96/130 X |
| 4,802,899 | 2/1989 | Vrana et al. | 96/109 |
| 4,810,265 | 3/1989 | Lagree et al. | 95/130 X |
| 5,258,056 | 11/1993 | Shirley et al. | 96/114 X |

FOREIGN PATENT DOCUMENTS

| | | | |
|---|---|---|---|
| 59-090614 | 5/1984 | Japan | 96/115 |

Primary Examiner—Robert Spitzer
Attorney, Agent, or Firm—Michael E. McKee

[57] ABSTRACT

A pressure swing adsorption apparatus including a compressor for pumping a flow of a gaseous mixture through an adsorption medium utilizes a capacity control system by which the operating capacity of the compressor can be preselected. The capacity control system is disposed upstream, i.e. on the suction side of, the compressor for limiting, when desired, the feed stream drawn into the compressor. A reduction in the operating capacity of the apparatus by way of the control system results in a corresponding reduction in the power consumption and noise levels of the compressor. The system is particularly advantageous when incorporated in an oxygen-generating unit intended for use by a patient requiring oxygen therapy in his home in that the capacity of a high capacity unit can be reduced, when appropriate, by a distributor or technician prior to use of the unit by the patient so that the patient receives the oxygen-rich product stream that he has been prescribed to receive and to reduce operating costs of the unit. The method of the invention includes the steps performed by the control system.

18 Claims, 4 Drawing Sheets

CAPACITY CONTROL SYSTEM FOR PRESSURE SWING ADSORPTION APPARATUS AND ASSOCIATED METHOD

BACKGROUND OF THE INVENTION

This invention relates to apparatus for separating gas mixtures by pressure swing adsorption and relates, more particularly, to the expenditure of energy involved in moving a gas through the adsorption components of such apparatus.

Pressure swing adsorption apparatus with which this invention is concerned includes a pair of adsorbers each having a fixed bed of adsorbent material and an inlet and an outlet accommodating a flow of gas therethrough. The adsorbent material of each adsorber is adapted to fractionate at least one constituent from a gaseous mixture when the gaseous mixture is sequentially directed into the inlet of one adsorber so that the one adsorber performs adsorption while the other adsorber is simultaneously purged of adsorbed constituent with product gas withdrawn from the one adsorber and then into the inlet of the other adsorber so that the other adsorber performs adsorption while the one adsorber is simultaneously purged of adsorbed constituent with product gas withdrawn from the outlet of the other adsorber. One such pressure swing adsorption apparatus is utilized for separating nitrogen from air delivered from an air source and for providing a product stream of relatively high oxygen purity.

Pressure swing adsorption apparatus commonly employ a compressor disposed upstream of the adsorbers for moving the gaseous stream through the adsorbers, and the flow rate of the product stream exiting the apparatus is typically regulated by means of a flow metering valve situated downstream of the adsorbers. However, a reduction in the product flow rate by way of such a flow metering valve does not result in a corresponding saving of energy at the compressor. For example, whether a pressure swing adsorption apparatus which is capable of delivering a product flow rate of 5.0 SLPM is used to deliver a (full-capacity) product stream of 5.0 SLPM or whether the product flow output of the apparatus is metered to meet smaller output requirements, the power requirements of the apparatus compressor are about the same in either instance. It would be desirable to provide a pressure swing adsorption apparatus capable of operating at either a high capacity mode (for meeting higher flow rate requirements) or a low capacity mode (for meeting lower flow rate requirements) so that when in the low capacity mode, the power requirements of the compressor are reduced.

Accordingly, it is an object of the invention to provide a new and improved means enabling a pressure swing adsorption apparatus to be operated in either a high capacity mode or a low capacity mode and so that the operation of the apparatus in the low capacity mode results in a reduction in the power requirements of the apparatus compressor.

Another object of the present invention is to provide such a means wherein operation of the apparatus in the lower capacity mode reduces the sound levels of the compressor as well as the amount of heat generated by the compressor.

Still another object of the present invention is to provide such a means which facilitates the preselection of the high capacity mode of operation or the lower capacity mode of operation prior to start-up of the apparatus.

Yet another object of the present invention is to provide such a means which is well-suited for use in pressure swing adsorption apparatus used to generate an oxygen-rich product from a feed stream of air wherein such means accommodates a preselection of a high capacity or lower capacity mode of operation prior to use of the apparatus by a patient requiring oxygen therapy.

A further object of the present invention is to provide such a means which is uncomplicated in construction and effective in operation.

A still further object of the present invention is to provide a new and improved method for altering the capacity of the compressor of a pressure swing adsorption apparatus between a high capacity mode and a lower capacity, energy-saving mode.

SUMMARY OF THE INVENTION

This invention resides in an improvement in an apparatus and an associated method involving adsorption components adapted to fractionate at least one constituent from a gaseous mixture by pressure swing adsorption. The apparatus and method also involves a compressor for pumping a feed stream of the gaseous mixture through the apparatus wherein the compressor includes a suction port through which the feed stream is drawn into the compressor and a discharge port through which the feed stream is pumped from the compressor and into the adsorption components of the apparatus.

The apparatus improvement comprises means associated with the compressor suction port for controlling the quantity of the feed stream drawn into the compressor.

The method of the invention includes the step carried out by the apparatus improvement. More specifically, the method includes the step of controlling the quantity of the feed stream drawn into the suction port of the compressor to thereby control the compressor power consumption.

DETAILED DESCRIPTION OF THE ILLUSTRATED EMBODIMENTS

Figure 1:
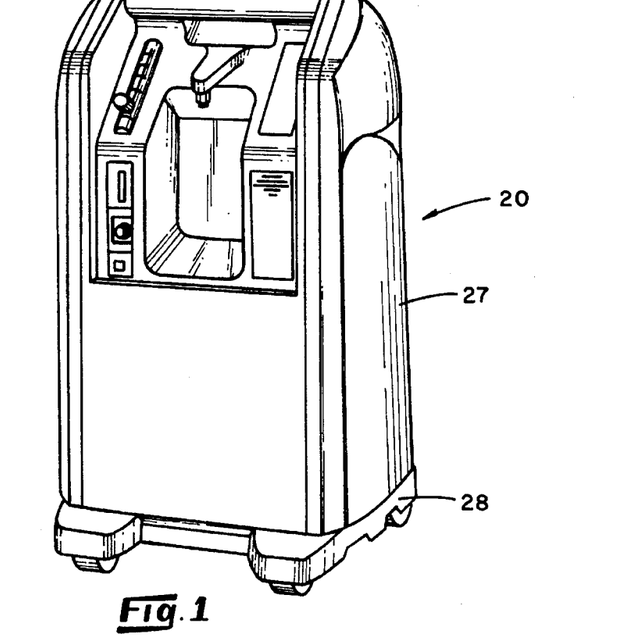
FIG. 1 is a perspective view of an oxygen concentrator unit within which an embodiment of a control system is utilized.
Figure 2:
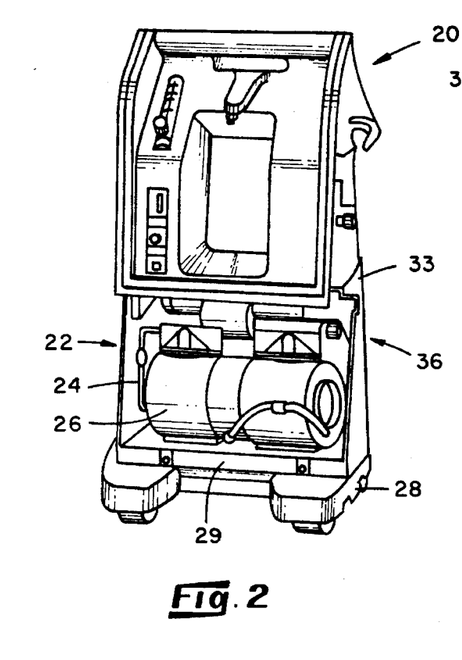
FIG. 2 is a perspective view, as seen generally from the front, of the FIG. 1 unit shown with portions of its outer casing removed from the remainder of the unit.
Figure 3:
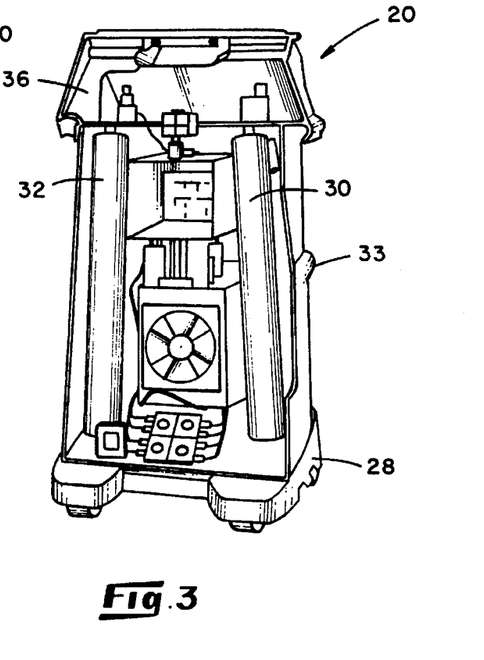
FIG. 3 is a perspective view, as seen generally from the back, of the FIG. 1 unit shown with portions of its outer casing removed from the remainder of the unit.

Turning now to the drawings in greater detail and considering first FIGS. 1–3, there is shown an embodiment, generally indicated 20, of an apparatus within which a capacity control system 22 (FIG. 2) in accordance with the present invention is incorporated. The apparatus 20 utilizes the principles of pressure swing adsorption for fractionating at least one component or constituent from a gaseous flow stream, and the control system 22 is associated with flow conduit means through which the gaseous stream enters the adsorption components of the apparatus 20. In the depicted apparatus 20, a compressor 26 draws a feed gas stream through a suitable input conduit 24 and pumps the stream through a network of flow conduits and adsorption components of the apparatus 20 situated downstream of the compressor 26. As will be apparent herein, the apparatus 20 is specifically described and illustrated in relation to the application of pressure swing adsorption to the fractionating of air to produce an oxygen-rich stream. Hence, the gaseous mixture supplied to the working components of the apparatus 20 by way of the compressor 26 is compressed atmospheric air. It will be understood, however, that the principles of the present invention can be variously applied.

The depicted apparatus, or oxygen concentrator, 20 includes a base 28, a compressor plate 29 overlying the base 28 for supporting the compressor 26 mounted thereon, support framework 33 mounted upon and extending upwardly from the base 28, a pair of upstanding adsorber units or towers 30, 32 attached to the framework 33, and an assembly, generally indicated 36 in FIG. 2, of valving means and associated componentry into which the flow of source air is directed. An outer casing 27 including several removable panels is positioned about the assembly of adsorber units 30, 32, compressor 26 and framework 33.

The principles of the fractionating a stream of air into its constituents by pressure swing adsorption are well known in the art so that a detailed description of the oxygen-generating operation of the apparatus 20 is not believed to be necessary. Briefly and with reference to FIGS. 3 and 4, each adsorber 30 or 32 has an interior cavity which is substantially filled with a bed of adsorption material, such as activated carbon, silica gel or a molecular sieve material known as sodium alumina silicate, adapted to adsorb nitrogen from air routed therethrough. Hence, air which is directed into the inlet of either adsorber 30 or 32 is exposed to the adsorber material before exiting the outlet of the corresponding adsorber.

Figure 4:
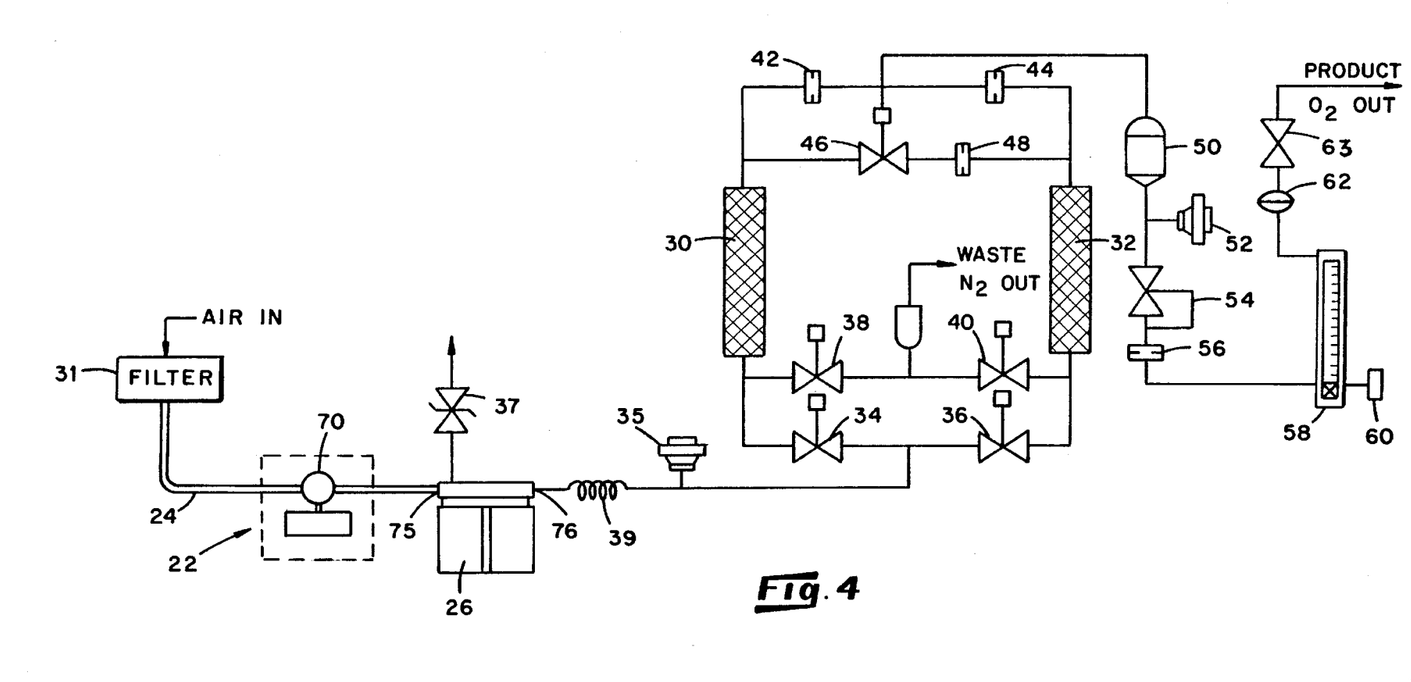
FIG. 4 is a schematic view illustrating in block diagram form the operation of the FIG. 1 unit.

During operation of the apparatus 20, the adsorbent material contained within the adsorbers 30 or 32 adsorbs nitrogen from air routed through the corresponding adsorber 30 or 32 from the inlet to the outlet thereof so that the gaseous product exiting the adsorber outlet is a high purity, e.g. in excess of 90% purity, oxygen gas. Furthermore, the adsorbent material is adapted to release its adsorbed nitrogen when purged by a purge gas for purposes of regenerating the adsorbent material. In the apparatus 20, only one of the adsorbers 30 or 32 performs adsorption at any one time while the other adsorber 32 or 30 undergoes regeneration. For increasing the efficiency of regeneration, an amount of the high purity oxygen produced by the adsorber 30 or 32 performing adsorption is used to purge the adsorber 32 or 30 undergoing regeneration.

With reference to FIG. 4, a pre-filter 31 is situated in the input flow conduit 24 disposed upstream of the compressor 26, along with the control system 22, and a heat exchanger 39 is disposed immediately downstream of the compressor 26 for cooling the compressed air which exits the compressor discharge port. In addition, there is provided a high pressure switch 35 and relief valve 37 associated with the compressor 26 as depicted in FIG. 4. Other components of the apparatus 20 situated downstream of the compressor 26 include feed valves 34, 36 and waste valves 38, 40 associated with the adsorber inlets, and purge orifices 42, 44, an equalization valve 46 and an equalization limiter 48 associated with the adsorber outlets. The oxygen-rich product stream exiting the adsorber towers 30, 32 is routed in sequence through a mixing tank 50, a low pressure switch 52, a pressure regulator 54, a product restrictor 56, and a flow meter 58 (having a needle valve 60) which are connected in the flow conduit downstream of the adsorber outlets. The pressure regulator 54 serves to maintain the product stream which exits the apparatus 20 at a relatively constant pressure level; otherwise, the routing of the feed stream through one adsorber and then through the other adsorber would effect relatively large pressure fluctuations at the apparatus outlet. Still further, a bacteria filter 62 and a check valve 63 are disposed in the product outlet conduit downstream of the flow meter 58.

Operation of the apparatus 20 can be described through an exemplary description of the sequencing of the valves of the apparatus 20. Before the apparatus 20 is initially turned ON, the equalization valve 46 is opened to permit the internal pressures of the adsorbers 30 and 32 to equalize. Meanwhile, the feed valves and waste valves are closed. At start-up of the apparatus 20, the equalization valve 46 is closed, and feed valve 34 and waste valve 40 are opened. The source air entering the apparatus 20 by way of the compressor 26 is thereby directed through the adsorber 30 from its inlet to its outlet so that high-purity oxygen is produced thereby, and an amount of oxygen emitted from the outlet of the adsorber 30 is directed through the adsorber 32 from its outlet to its inlet by way of the purge orifice 44 so that nitrogen purged from the adsorber 32 is forced to exit the apparatus 20 through the waste valve 40.

When the adsorber 30 becomes about saturated, each of the feed valve 34 and waste valve 40 is closed and the equalization valve 46 is opened to thereby permit the internal pressures of the adsorbers 30 and 32 to equalize. Once the adsorber pressures are equalized, the equalization valve 46 is closed and each of the feed valve 36 and waste valve 38 is opened. The source air entering the apparatus 20 through the compressor 26 is thereby directed through the adsorber 32 from its inlet to its outlet so that high-purity oxygen is produced thereby, and an amount of oxygen emitted from the outlet of the adsorber 32 is directed through the adsorber 30 from the outlet to the inlet thereof by way of the purge orifice 42 so that nitrogen purged from the adsorber 30 exits the apparatus 20 through the waste valve 38.

When the adsorber 32 becomes about saturated, each of the feed valve 36 and waste valve 38 is closed, and the equalization valve 46 is opened to thereby permit the internal pressures of the adsorbers 30 and 32 to equalize. At this point, the cycles of operation are repeated with the closing of the equalization valve 46 and the re-opening of the feed valve 34 and waste valve 40. It follows that while one adsorber 30 or 32 produces oxygen-rich gas in a product-producing cycle, the other adsorber 32 or 30 is being purged of the adsorbed air constituent in a regeneration operation, and vice-versa.

Each of the aforementioned feed, waste, and equalization valves is preferably a solenoid-type valve responsive to a turning on or shutting off of power to the valve, and control of the various product-producing and regeneration operations can be had by appropriately sequencing the opening and closing of the aforedescribed feed, waste and equalization valves. In the apparatus 20, control of the aforedescribed valves is achieved by timing mechanisms associated with control switches mounted within the casing 27 and operatively wired to the valves for turning the valves ON and OFF at the end of a predetermined period of time. Hence, the product-producing and regeneration operations are automatically controlled in the apparatus 20 by automatically controlling the amount of time that each of the feed, waste and equalization valves are opened and closed. For a more detailed description of the components and operation of an air separator unit whose operation is comparable to that of the depicted apparatus 20, reference can be had to U.S. Pat. No. 4,802,899, the disclosure of which is incorporated herein by reference.

As mentioned earlier and with reference again to FIGS. 2 and 4, it is the compressor 26 which pumps the feed gas stream toward and through the adsorbers 30, 32. In this connection, the compressor 26 includes an inlet, or suction, port 74 (best shown in FIG. 5), through which the feed stream of atmospheric air is drawn into the interior of the compressor 26 and a outlet, or discharge, port 75 through which the feed stream exits the compressor interior in a compressed, or pressurized, condition.

The compressor 26 of the depicted apparatus 20 is appropriately sized to be capable of providing a product stream flow rate (as measured downstream of the regulator 54 and through the flowmeter 58) of about 5.0 SLPM at a pressure of 28 psig. At full capacity, the power consumption of the compressor 26 is about 350 watts. It is a feature of the apparatus 20 that its control system 22 provides means by which a unit technician, a distributer or some other qualified individual can readily set the apparatus 20 to operate at one of two operating modes, one of which is the aforedescribed full capacity mode and the other of which is a reduced capacity, energy-saving mode. The advantage of such a two-mode feature can be readily appreciated in light of the fact that patients who are required, by way of prescription, to receive oxygen therapy may require a therapy flow rate in the vicinity of about 5.0 SLPM or a therapy flow rate in the vicinity of about 3.0 SLPM. Of course, the apparatus 20 can be used to deliver the required 5.0 SLPM or 3.0 SLPM output flow rate while in its full-capacity mode, but the apparatus compressor 26 requires about 350 Watts in either instance. By making the appropriate adjustment, by way of the control system 22, to reduce the capacity of the compressor 26 for the patient who requires only the 3.0 SLPM output, the power consumption of the compressor 26, and thus the operating cost of the apparatus 20, is reduced as well. Thus, the regulator system 22 permits the apparatus 20 to be used in either a high capacity mode of operation or a lower capacity, energy-saving mode of operation.

Figure 5:
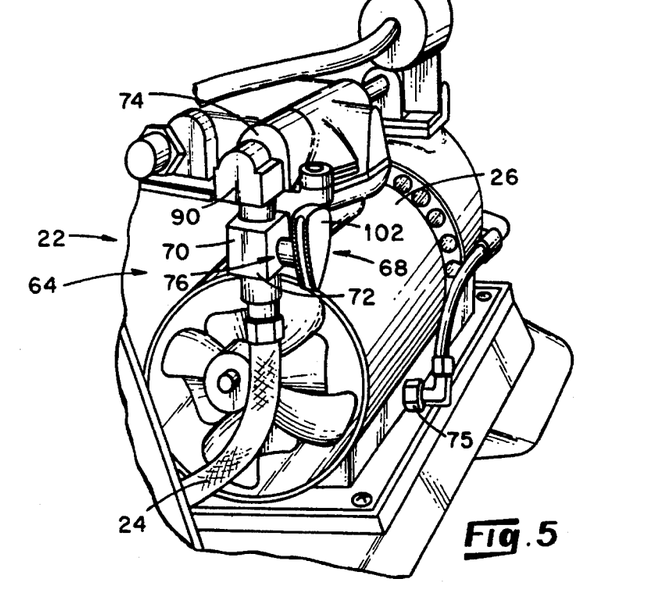
FIG. 5 is a perspective view of a fragment of the FIG. 1 unit.
Figure 6:
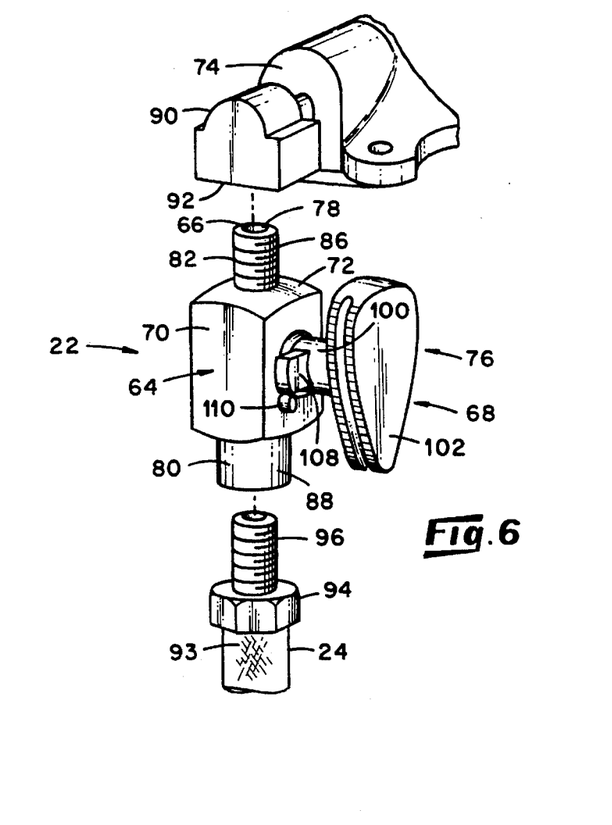
FIG. 6 is a perspective view of a portion of the fragment illustrated in FIG. 5, shown exploded.
Figure 7:
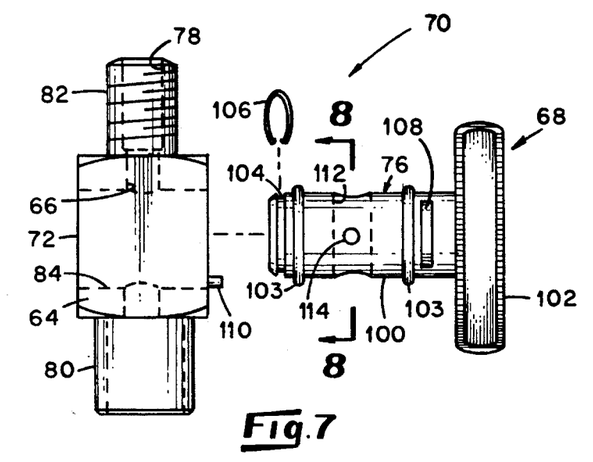
FIG. 7 is an elevational view of components illustrated in FIG. 6, as seen generally from the left in FIG. 6 and shown exploded.

With reference to FIGS. 5–7, the control system 22 includes means, generally indicated 64, defining a passageway 66 through which at least a portion of the gaseous, i.e. air, feed stream is drawn into the compressor inlet 74 and means, generally indicated 68, for restricting, upon the occurrence of a predetermined event (such as is described herein), the passageway 66 so that the quantity of the feed stream which flows into the compressor 26 is reduced. Thus, when the control system 22 is set in one condition, a first feed stream quantity is drawn through the passageway 66 by the compressor 26, and when the control system 22 is set in another condition, a second feed stream quantity is drawn through the passageway 66 by the compressor 26.

The control system 22 of the depicted apparatus 20 includes a valve 70 having a body 72 and a plug 76 rotatably mounted within the body 72. As will be apparent herein, the passageway-defining means 64 of the system 22 is provided by the body 72 of the valve 70, while the restricting means 68 of the system 22 is provided by the plug 76 of the valve 70. The valve body 72 (best shown in FIG. 7) is elongated in shape and has two opposite inlet and outlet ends 80, 82, respectively, and includes a passageway 78 extending between the inlet and outlet ends 80, 82. A through-opening 84 is formed in the body 72 so as to communicate with the passageway 78 and is sized to closely accept the valve plug 76. The body 72 may be comprised of any of a number of suitable materials such as brass or steel.

The valve body 72 is connected in the conduit line 24 leading to the inlet port 74 of the compressor 26. To this end and as best shown in FIG. 6, there is provided an externally-threaded (male) portion 86 at the outlet end 82 of the valve body 72, and an internally-threaded (female) portion 88 is provided at the inlet end 80. An elbow connector member 90 is joined directly to the compressor inlet and has an opening 92 which threadably accepts the male portion 86. The conduit line 24 includes a suction hose 93 which terminates at a fitting 94 having a nipple 96 which is threadably accepted by the body (inlet) end portion 80. Preferably, Teflon® tape is positioned about the threads of the male portion 86 and nipple 96 enhance the seal between the parts when threadably received by the corresponding component 90 or portion 88.

Figure 8:
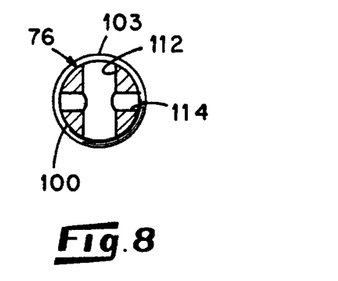
FIG. 8 is a cross-sectional view taken about along line 8—8 of FIG. 7.

With reference to FIGS. 7 and 8, the valve plug 76 includes a cylindrically-shaped body portion 100 which is rotatably received by the through-opening 84 of the valve body 72 and a knob 102 joined at one end of the body portion 100 to facilitate the manual rotation of the valve plug 76 relative to the valve body 72. The body portion 100 also includes annular grooves within which are positioned O-rings 103, 103 which extend about the surface of the body portion 100 to enhance the seal between the plug 76 and the walls of the opening 84. For securing the plug 76 within the through-opening 84, an annular groove 104 is provided in the body portion 100 adjacent the end thereof opposite the knob 102 for accepting a retainer key 106 (FIG. 7) positioned therein. Thus, when the plug 76 is fully inserted within the through-opening 84 and the key 106 is positioned within the groove 104, the plug 76 is prevented from being removed from the through-opening 84 (in a rightward direction as viewed in FIG. 7) by the key 106.

Figure 9:
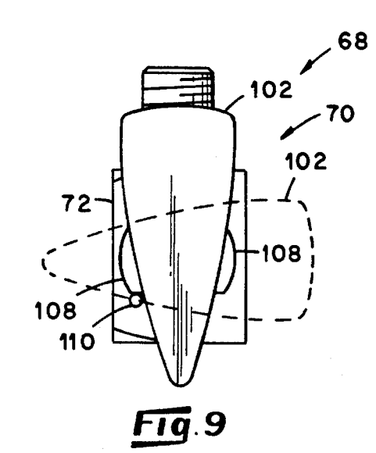
FIG. 9 is an elevational view of the components of FIG. 7, as seen from the right in FIG. 7.

As will be apparent herein, the plug 76 is rotatable within and relative to the valve body 72 through about ninety angular degrees. To this end, a pair of protuberances 108 (FIGS. 6, 7 and 9) are integrally formed within the body portion 100 adjacent the knob 102, and a pin 110 is fixed within one side of the valve body 72 as shown in FIGS. 6 and 9. The protuberances 108 are shaped and cooperate with the pin 110 so that the knob 102 can only be moved in a clockwise direction, as viewed in FIG. 9, from its position illustrated in solid lines in FIG. 9 through about ninety angular degrees to the position illustrated in phantom in FIG. 9 and so that the knob 102 can only be moved in a counter-clockwise direction, as viewed in FIG. 9, from its illustrated phantom-line position through about ninety angular degrees to the illustrated solid-line position. The protuberances 108 also serve as stops which limit the distance that the body portion 100 can be inserted within the through-opening 84 when the valve 70 is assembled.

With reference again to FIGS. 7 and 8, the body portion 100 of the valve plug 76 defines a first bore 112 and a second bore 114 which each extend transversely through the plug body portion 100 and so that the second bore 114 intersects the first bore 112 at substantially a right angle. The first bore 112 has a cross section which is substantially the same size as that of the valve body passage 78, and the second bore 112 has a cross section which is appreciably smaller than that of, i.e. about one-half the diameter of, the passage 78. The bores 112, 114 are arranged about the body portion 76 and in relation to the protuberances 108 so that when the knob 102 is positioned in its FIG. 9 solid-line position, the first bore 112 is positioned in registry with the valve body passage 78 and so that when the knob 102 is positioned in its FIG. 9 phantom-line position, the second bore 114 is positioned in registry with the valve body passage 78.

It follows that when the knob 102 is positioned in its FIG. 9 solid-line position, the first bore 112 permits the feed stream drawn by the compressor 26 to move through the valve body passage 78 substantially unrestricted. Conversely, when the knob 102 is positioned in its FIG. 9 phantom-line position, the second bore 114 (due to its reduced diameter) appreciably restricts, or limits, the feed stream drawn by the compressor 26 through the passage 78. Thus, as long as the knob 102 is positioned in the FIG. 9 solid-line position, the compressor 26 is capable of drawing a first (greater) feed stream into its suction port 74, but when the knob 102 is positioned in its FIG. 9 phantom-line position, the compressor 26 is capable of drawing a second feed stream quantity into its suction port 74.

Tests conducted with the apparatus 20 in each of the high and low capacity modes yielded the following results:

| Product Flow Rate (SLPM) | Compressor Power (Watts) | $O_2$ Purity of Product |
|---|---|---|
| HIGH CAPACITY MODE | | |
| 1.0 | 350 | 95% |
| 3.0 | 350 | 95% |
| 5.0 | 350 | 92% |
| LOWER CAPACITY MODE | | |
| 1.0 | 275 | 95% |
| 3.0 | 275 | 90% |
| 5.0 | 275 | 65% |

It can be seen from the test results provided above that the apparatus 20 is capable of delivering (upon appropriate adjustment of the flow meter 58) a product flow of between 1.0 and 5.0 SLPM, but the compressor power consumption is less when the apparatus 20 is operated in its lower capacity mode. It can also be noted that the oxygen concentration of the product is sacrificed as a consequence of the reduction in compressor capacity. Therefore, on one hand, a patient who requires a flow of 3.0 SLPM of an oxygen-rich product stream (defined for present purposes as having an oxygen concentration of at least about 90%) can use the apparatus 20 when in its low capacity mode to reduce the operating power requirements and still receive a product flow having an oxygen concentration of about 90%. On the other hand, however, a patient who requires a flow of 5.0 SLPM of an oxygen-rich stream may not adequately benefit from the use of the apparatus 20 when in its low capacity mode since the oxygen concentration, e.g. 65%, of the product stream is so low. Thus, as a practical matter, this latter patient who requires the 5.0 SLPM stream of oxygen-rich product would probably not use the apparatus 20 when in its low capacity mode.

The control system 22 is therefore advantageous in that it provides a means by which the apparatus 20 can be preset to operate at one of two capacity settings wherein the apparatus 20 is capable of providing in the higher capacity setting an oxygen-rich product stream at relatively high flow rates and wherein the apparatus is capable of providing in the lower capacity setting an oxygen-rich product stream at lower flow rates with a smaller consumption of compressor power. As mentioned earlier, while some patients who require oxygen therapy require an oxygen-rich product output as high as 5.0 SLPM, many do not and, instead, require an output of about 3.0 SLPM. Before the apparatus 20 is used by a patient, the operating mode of the apparatus 20 is preset by adjusting, if necessary, the valve 70 of the control system 22 to ensure that in one situation, the patient who is prescribed to receive a 5.0 SLPM flow rate will receive the product stream with a sufficient concentration of oxygen or that, in the other situation, that the operating power of the apparatus is reduced.

If, in addition to setting the valve 70 so that the apparatus 20 is in its lower capacity mode and the flow meter 58 is adjusted to provide an output of 3.0 SLPM, the pressure regulator 54 is also adjusted so that the pressure of the product gas stream exiting the apparatus 20 is appreciably reduced, the regulator 54 helps to limit the oxygen discharge from the apparatus 20 if the valve 70 is subsequently re-set (by, for example, unauthorized personnel) to the high capacity mode setting and the flow meter 58 is adjusted in an attempt to increase the product flow rate. When, for example, the valve 70 is set to operate in its reduced 3.0 SLPM mode and the regulator 54 is adjusted so that the product stream can never exceed 3.0 SLPM, the regulator 54 will prevent the user from drawing off more than the prescribed 3.0 SLPM, even if the valve 70 were reset to the high capacity mode. Thus, in this situation, the regulator 54 acts to prevent the user from drawing off a higher product flow rate which, as mentioned earlier, may possess an oxygen concentration which is below an acceptable level.

Another advantage provided by the control system 22 relates to the fact that during operation of the apparatus 20 when in its lower capacity, energy-saving mode, the noise level of and the amount of heat generated by the compressor 26 is reduced.

Figure 10:
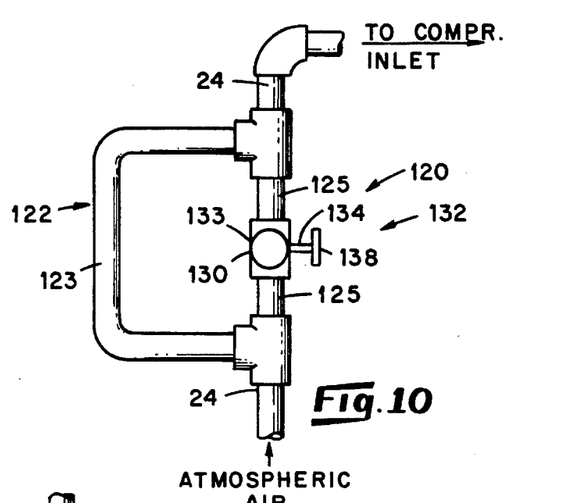
FIG. 10 is a view illustrating schematically another embodiment of a control system capable of use with the FIG. 1 unit.

With reference to FIG. 10, there is shown another embodiment, generally indicated 120, of a capacity control system for controlling the capacity and power consumption of a pressure swing adsorption apparatus. The control system 120 includes a flow network 122 including two conduits 123, 125 which are joined in parallel flow relationship with one another in the input conduit 24 upstream of the compressor inlet. The control system 120 also includes means, generally indicated 132, for selectively opening or closing the flow conduit 125. To this end, the shut-off means 132 is in the form of a shut-off valve 133 including a valve body 130 and a plug body 134 which is rotatably received within the valve body 130. The plug body 134 is provided with a bore which is positioned in registry with the passageway of the conduit 125 when the body 134 is positioned in a first rotational position with respect to the body 130 and which is positioned normal to the path of the passage of the conduit 125 when the body 134 is rotated to a second rotational position disposed about ninety angular degrees from the one rotational position. Thus, by rotating the plug body 134 (by means of the knob 138) from the first rotational position to the second rotational position, the plug body 136 is moved from a first condition at which the input feed stream is permitted to flow to the compressor through both conduits 123 and 125 to a second condition at which the flow of the input feed stream through the conduit 125 is shut off and so that the input feed stream is permitted to flow to the compressor through only the conduit 123. Therefore, by moving the plug body 134 between the aforedescribed first and second conditions, the input feed stream entering the compressor is altered between a larger quantity and a reduced quantity, respectively. The conduit 123, or more specifically, the passageway of the conduit 123, can be appropriately sized to provide the desired, i.e. reduced, capacity of the apparatus.

Figure 11:
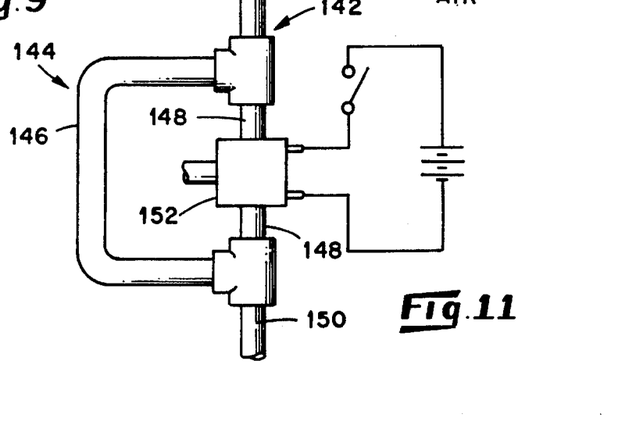
FIG. 11 is a view illustrating schematically still another embodiment of a control system.

It will be understood that numerous modifications and substitutions can be had to the aforedescribed embodiment without departing from the spirit of the invention. For example, although each of the aforedescribed control system 22 of FIGS. 1–9 and the control system 120 of FIG. 10 has been shown and described as including manually-operated valves, electrically-actuatable, e.g. solenoid, valves can be used. For example, there is shown in FIG. 11 still another control system embodiment, generally indicated 142, including a flow network 144 including two conduits 146, 148 which are joined in parallel flow relationship with one another in an input conduit 150 disposed upstream of the compressor suction port. The system 142 also includes an electrically-operated solenoid valve 152 for selectively opening and closing the flow conduit 148. When the valve 152 is de-actuated, the feed stream is permitted to enter the compressor suction port by way of both conduits 146, 148, and when the valve 152 is actuated, the feed stream is permitted to enter the compressor suction port only by way of the conduit 146, thereby reducing the quantity of the input feed stream entering the compressor of the adsorption apparatus with which the system 142 is used and thus reducing the compressor capacity.

Moreover, the control system valve may take the form of a globe valve, as well as a gate valve. Furthermore, although the aforedescribed control system valves 70 and 132 have been shown and described as operable at one of two alternative positions, a valve for use in a regulator system can be operable in any of a number of alternative positions or be a proportional valve. In the instance in which a proportional valve is employed, the capacity of the compressor can be adjusted, and the power consumption altered accordingly, between an infinite number of capacity settings. Accordingly, the aforedescribed embodiments are intended for the purpose of illustration and not as limitation.

I claim:

1. A method for regulating the power consumption of a pressure swing adsorption apparatus including adsorption components adapted to fractionate at least one constituent from a gaseous mixture by pressure swing adsorption and including a compressor for pumping a feed stream of the gaseous mixture through the apparatus wherein the compressor includes a suction port through which the feed stream is drawn into the compressor and a discharge port through which the feed stream is pumped from the compressor and into the adsorption components of the apparatus and wherein a restriction in the amount of the feed stream permitted to be drawn into the compressor suction port effects a decrease in the power requirements of the compressor, the method comprising the steps of:

controlling the quantity of the feed stream drawn into the suction port of the compressor between one non-zero level at which the quantity of the feed stream drawn into the compressor suction port is substantially unrestricted and another non-zero level at which the quantity of the feed stream drawn into the compressor suction port is appreciably restricted to thereby control the compressor power consumption.

2. The method as defined in claim 1 wherein the pressure swing adsorption apparatus includes means defining at least one passage through which the feed stream is moved as it is drawn into the compressor suction port and the step of controlling includes the step of restricting the one passage to thereby reduce the quantity of the feed stream drawn into the compressor suction port.

3. In an apparatus including adsorption components adapted to fractionate at least one constituent from a gaseous mixture by pressure swing adsorption and including a compressor for pumping a feed stream of the gaseous mixture through the apparatus wherein the compressor includes a suction port through which a feed stream of air is drawn into the compressor and a discharge port through which the feed stream drawn is pumped from the compressor and into the adsorption components of the apparatus, the improvement comprising:

means associated with the compressor suction port for controlling the quantity of the feed stream of air drawn into the compressor wherein the controlling means includes at least one passage through which the feed stream of air is moved as it is drawn toward the compressor suction port and means for restricting the one passage to threreby reduce the quantity of the feed stream of air drawn into the compressor suction port, the means for restricting includes moveable means associated with one passage for movement relative thereto between a first condition at which the quantity of the feed stream drawn through the one passage by the compressor is a first non-zero quantity of air and a second condition at which the quantity of the feed stream drawn through the one passage by the compressor is a second non-zero quantity of air to accomodate an adjustment of the quantity of the air feed stream drawn into the compressor suction port between two non-zero levels.

4. The improvement as defined in claim 3 wherein the restricting means includes means for moving the movable means between the first and second conditions.

5. The improvement as defined in claim 4 wherein the moving means is actuatable so that when the moving means is actuated, the movable means is positioned in one of the first and second conditions, and when the moving means is deactuated, the movable means is positioned in the other of the first and second conditions.

6. The improvement as defined in claim 4 wherein the restricting means includes a valve having a plug body which is movable relative to the one passage between two positions so that when the plug body is positioned in a first of the two positions, the first quantity of the feed stream is drawn through the one passage by the compressor and so that when the plug body is positioned in the second of the two positions, the second quantity of the feed stream is drawn through the one passage by the compressor.

7. The improvement as defined in claim 6 wherein the plug body includes two passageways formed therein and wherein the passageways have cross sections of different sizes so that when the plug body is positioned in the first position, one of the two passageways is substantially positioned in registry with the one passage and so that when the plug body is positioned in the second position, the other of the two passageways is substantially positioned in registry with the one passage.

8. The improvement as defined in claim 1 wherein the adsorption components of the apparatus are adapted to fractionate at least one constituent from a gaseous mixture to produce a product which exits the apparatus in a product stream and wherein the improvement further comprises a pressure regulator situated downstream of the adsorption components for reducing the pressure of the product stream exiting the apparatus in conjunction with the reduction of the quantity of the feed stream drawn into the compressor by way of the controlling means.

9. In a pressure swing adsorption apparatus including adsorption medium adapted to adsorb nitrogen from a feed stream of air by pressure swing adsorption so that an oxygen-rich product exits the apparatus in a gaseous stream and including a compressor for pumping the feed stream of air toward and through the adsorption medium wherein the compressor includes a suction port through which the feed stream is drawn into the compressor and a discharge port through which the feed stream drawn is pumped from compressor and through the adsorption medium and wherein a restriction in the amount of the feed stream permitted to be drawn into the compressor suction port effects a decrease in the power requirements of the compressor, the improvement comprising:

means associated with the compressor suction port for regulating the quantity of the feed stream permitted to be drawn into the compressor suction port between one non-zero level at which the quantity of the feed stream permitted to be drawn into the compressor suction port is substantially unrestricted and another non-zero level at which the quantity of the feed stream permitted to be drawn into the compressor suction port is appreciably restricted to thereby regulate the power consumption of the compressor.

10. The improvement as defined in claim 9 wherein the means for regulating includes means defining a passage through which atmospheric air moves as it is drawn into the compressor suction port and passage-restricting means cooperable with the passage-defining means for restricting at least a portion of the passage.

11. The improvement as defined in claim 10 wherein the passage-restricting means includes a body which is movable relative to the passage between a first position at which a first quantity of atmospheric air is permitted to be drawn into the compressor and a second position at which a second quantity of atmospheric air is permitted to be drawn into the compressor.

12. The improvement as defined in claim 9 wherein the regulating means includes means defining at least one passage through which the feed stream of air is moved as it is drawn toward the compressor suction port and means for restricting the one passage to thereby reduce the quantity of the feed stream of air drawn into the compressor suction port.

13. The improvement as defined in claim 12 wherein the means for restricting includes movable means associated with the one passage for movement relative thereto between a first condition at which the quantity of the feed stream of air drawn through the one passage by the compressor is a first quantity and a second condition at which the flow rate of the feed stream of air drawn through the one passage by the compressor is a second quantity.

14. The improvement as defined in claim 13 wherein the restricting means includes means for moving the movable means between the first and second conditions.

15. The improvement as defined in claim 14 wherein the moving means is actuatable so that when the moving means is actuated, the movable means is positioned in one of the first and second conditions, and when the moving means is deactuated, the movable means is positioned in the other of the first and second conditions.

16. The improvement as defined in claim 13 wherein the restricting means includes a valve having a plug body which is movable relative to the one passage between two positions so that when the plug body is positioned in a first of the two positions, the first quantity of the feed stream is drawn through the one passage by the compressor and so that when the plug body is positioned in the second of the two positions, the second quantity of the feed stream is drawn through the one passage by the compressor.

17. The improvement as defined in claim 16 wherein the plug body includes two passageways formed therein and wherein the passageways have cross sections of different sizes so that when the plug body is positioned in the first position, one of the two passageways is substantially positioned in registry with the one passage and so that when the plug body is positioned in the second position, the other of the two passageways is substantially positioned in registry with the one passage.

18. The improvement as defined in claim 9 further comprising a pressure regulator situated downstream of the adsorption medium for reducing the pressure of the gaseous stream exiting the apparatus in conjunction with the reduction of the quantity of the feed stream drawn into the compressor by way of the regulating means.

* * * * *